(12) United States Patent
Pala et al.

(10) Patent No.: US 11,599,603 B1
(45) Date of Patent: Mar. 7, 2023

(54) SYSTEMS AND METHODS FOR SECURE ELEMENT REGISTRATION AND PROVISIONING

(71) Applicant: CABLE TELEVISION LABORATORIES, INC., Louisville, CO (US)

(72) Inventors: Massimiliano Pala, Longmont, CO (US); Ronald H. Ih, Los Altos, CA (US); Carl Fredrick Pettersson, Pleasanton, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 60 days.

(21) Appl. No.: 17/353,114

(22) Filed: Jun. 21, 2021

Related U.S. Application Data

(63) Continuation of application No. 16/054,793, filed on Aug. 3, 2018, now Pat. No. 11,042,609.

(60) Provisional application No. 62/596,425, filed on Dec. 8, 2017, provisional application No. 62/540,726, filed on Aug. 3, 2017.

(51) Int. Cl.
| | |
|---|---|
| *G06F 21/00* | (2013.01) |
| *G06F 21/10* | (2013.01) |
| *G06F 21/33* | (2013.01) |
| *H04L 9/32* | (2006.01) |
| *H04L 9/40* | (2022.01) |
| *H04L 9/08* | (2006.01) |
| *G06F 21/44* | (2013.01) |

(52) U.S. Cl.
CPC ............ *G06F 21/105* (2013.01); *G06F 21/33* (2013.01); *G06F 21/44* (2013.01); *H04L 9/0877* (2013.01); *H04L 9/321* (2013.01); *H04L 9/3268* (2013.01); *H04L 63/0823* (2013.01); *G06F 2211/008* (2013.01); *H04L 63/0876* (2013.01)

(58) Field of Classification Search
CPC ........ G06F 21/105; G06F 21/33; G06F 21/44; G06F 2211/008; H04L 9/0877; H04L 9/321; H04L 9/3268; H04L 63/0823; H04L 63/0876
See application file for complete search history.

(56) References Cited

U.S. PATENT DOCUMENTS 11,177,967 B2 * 11/2021 Pala .................... H04L 41/0803
11,290,286 B2 * 3/2022 Pala .................... H04L 63/0876
(Continued)

*Primary Examiner* — Jeffery L Williams
(74) *Attorney, Agent, or Firm* — Armstrong Teasdale LLP

(57) ABSTRACT

A method for registering and provisioning an electronic device is provided. The method includes a step of inserting a first keypair into a secure element of the electronic device. The first keypair includes a public key and a private key. The method further includes a step of requesting, from a remote server configured to register and provision connected devices, a provisioning of credentials of the electronic device. The method further includes a step of verifying, by the remote server, the electronic device credentials. The method further includes a step of registering, by the remote server, the electronic device. The method further includes a step of transmitting, from the remote server to the electronic device, a device certificate. The method further includes steps of installing the transmitted device certificate within the secure element of the electronic device, and provisioning the electronic device according to the installed device certificate.

20 Claims, 6 Drawing Sheets

(56) References Cited

U.S. PATENT DOCUMENTS

| | | | |
|---|---|---|---|
| 2012/0159105 A1* | 6/2012 | von Behren | H04L 9/08 711/164 |
| 2012/0159148 A1* | 6/2012 | Behren | G06Q 20/3823 713/150 |
| 2012/0159163 A1* | 6/2012 | von Behren | G06Q 20/3823 713/168 |
| 2012/0159195 A1* | 6/2012 | von Behren | G06F 21/62 713/193 |
| 2013/0111207 A1* | 5/2013 | von Behren | G06Q 20/35765 713/164 |
| 2013/0121493 A1* | 5/2013 | von Behren | G07F 7/1016 380/270 |
| 2015/0312041 A1* | 10/2015 | Choi | H04L 63/0861 713/175 |
| 2017/0200225 A1* | 7/2017 | Kanungo | H04L 9/0825 |
| 2017/0213211 A1* | 7/2017 | Sibert | H04L 63/0861 |
| 2019/0042708 A1* | 2/2019 | Pala | H04L 9/3268 |
| 2022/0224549 A1* | 7/2022 | Pala | H04W 12/35 |

\* cited by examiner

SYSTEMS AND METHODS FOR SECURE ELEMENT REGISTRATION AND PROVISIONING

CROSS REFERENCE TO RELATED APPLICATIONS

This application is a continuation of U.S. patent application Ser. No. 16/054,793, filed Aug. 3, 2018. U.S. patent application Ser. No. 16/054,793 claims the benefit of and priority to U.S. Provisional Patent Application Ser. No. 62/540,726, filed Aug. 3, 2017, and to U.S. Provisional Patent Application Ser. No. 62/596,425, filed Dec. 8, 2017. All of these prior applications are incorporated herein by reference in their entireties.

BACKGROUND

The field of the disclosure relates generally to the management of device registration, and more particularly, to systems and methods for securely registering and provisioning electronic devices.

Many conventional electronic devices interact with secure electronic networks and computer systems. Many of these networks and systems are subject to significant security protections, however, the electronic devices that interact with the systems may not be subject to the same levels of security. Therefore, it is important to be able to reliably determine the identity of such electronic devices in order to provision the devices for use within a particular network, system, or ecosystem. Such provisioning techniques are not trivial. Many conventional electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce.

At present, conventional IoT infrastructures are known to employ hardware roots of trust that aim to establish a tamper-resistant secure element, that is, a "black box," that use built-in cryptographic keys to perform cryptographic operations, such as encryption, decryption, and hashing. Examples of such hardware roots of trust include the Trusted Platform Module (TPM) and the Hardware Security Module (HSM). These trust models/schemes are used for remote attestation, with the attestation being typically performed by a third party and/or a Cloud services user. Conventional HSM infrastructures often utilize PKI.

PKI uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

In conventional PKI ecosystems, the management of keys, as well as the process of inserting the keys into the devices or secure elements, is problematic, expensive, and difficult to audit. Because of these difficulties, device manufacturers that utilize PKI are today required to add PKI costs to the bill of materials of each device at the time of manufacture, irrespective of whether the device may be eventually sold to, or activated by, a consumer. Nevertheless, the security benefits provided to the device are often considered to outweigh the risk of purchasing a PKI keypair that might not be sold. However, the risk of not recouping the PKI bill of materials investment, which is often compounded by the inability of the device manufacturers to charge a premium for the added security, has been an obstacle to the utilization of PKY by many industries.

Where manufacturers undertake the burden to provision a secure element of an electronic device, the manufacturer is subject to the additional costs a manufacturing production-line hardware elements, such as HSMs, for example. The requirements to provision PKI at the manufacturing level were therefore often difficult to implement, particularly with respect to such PKI requirements as revocation, potential auditing, and the ability/inability of the manufacturer to share CA keys. These difficulties increase significantly wherein electronic device is manufactured using a secure element from a different manufacturer, when multiple secure elements may be used within a single electronic device, and/or when an electronic device/secure element is provisioned and registered in more than one ecosystem.

In particular, many conventional IoT devices may be deployed in more than one ecosystem (e.g., Open Connectivity Foundation (OCF), AllSeen/AllJoyn, Nest/Thread, Zigbee, etc.), and a different key may be inserted at the time of manufacture on a device for each ecosystem into which deployment is desired. The manufacturers must add to the PKI bill of materials the cost for each such inserted keypair, even if the device is never activated in the corresponding ecosystems. Accordingly, it is desirable to develop a simplified provisioning and registration approach for manufacturers and for cross-manufacturer support.

BRIEF SUMMARY

In an embodiment, a method for registering and provisioning an electronic device is provided. The method includes a step of inserting a first keypair into a secure element of the electronic device. The first keypair includes a public key and a private key. The method further includes a step of requesting, from a remote server configured to register and provision connected devices, a provisioning of credentials of the electronic device. The method further includes a step of verifying, by the remote server, the electronic device credentials. The method further includes a step of registering, by the remote server, the electronic device. The method further includes a step of transmitting, from the remote server to the electronic device, a device certificate. The method further includes steps of installing the transmitted device certificate within the secure element of the electronic device, and provisioning the electronic device according to the installed device certificate.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
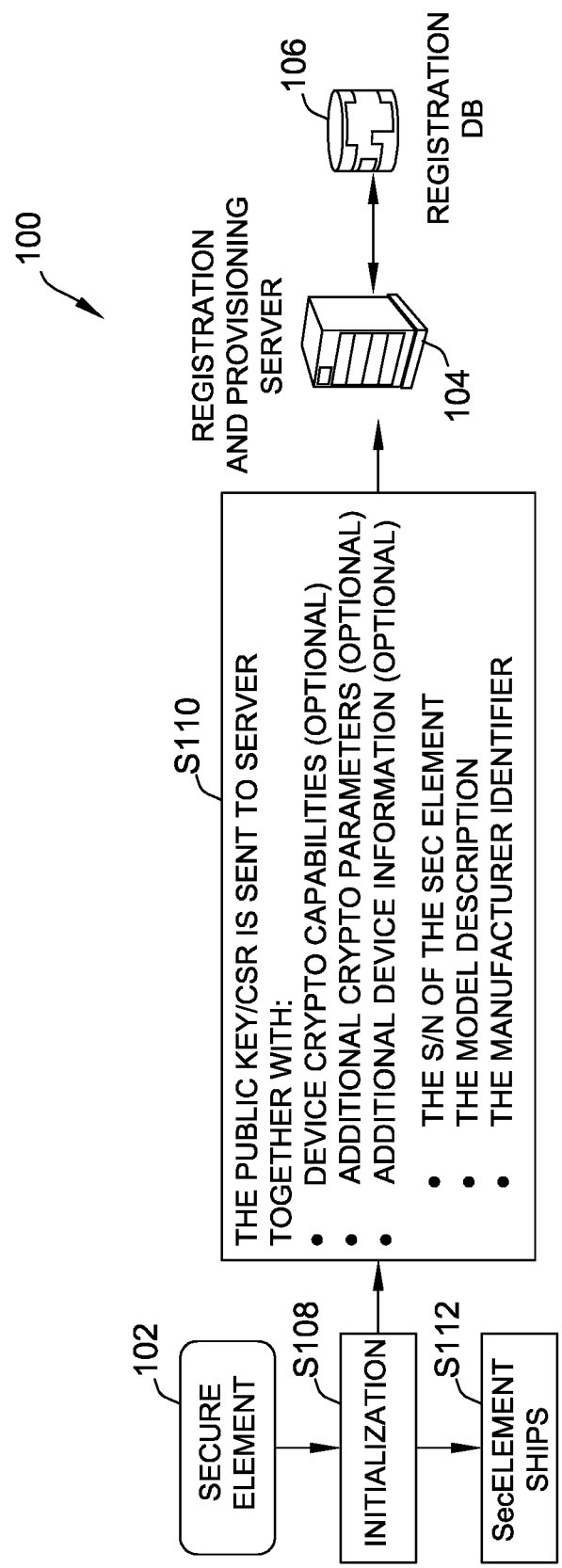
FIG. 1 is a schematic illustration of an initialization and registration process for a secure element, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide systems and methods for registering the credentials of a secure element, and then provisioning the secure element with a device certificate. For ease of explanation, the present embodiments primarily describe the secure element in terms of hardware, but a person of ordinary skill in the art will understand the innovative techniques herein are applicable to innovative software techniques as well.

In an exemplary embodiment, steps for registering a device, in preparation for provisioning, may include without limitation: (i) a secure element generates a secret, such as a public/private keypair, a symmetric key, or a passphrase; (ii) the secure element generates additional cryptographic parameters, such as a Diffie-Hellman (DH) parameter, an additional keypair, etc., which may be utilized for secure authentication and/or communication with the secure element; (iii) using a public/private keypair or cryptographic element, the secure element (or associated system) sends a public part of generated parameters (e.g., raw data, or in a signed data structure), optionally together with the list of supported cryptographic algorithms and ciphers, and a signature to a registry (e.g., utilizing a registration server); (iv) a registration server stores the data/data structure in a database; and (v) the registration server sends a confirmation token to the secure element. Upon completion of one or more of these steps, the secure element may be readied for provisioning with a device certificate once the element is deployed in a device.

In an embodiment, one or more keypairs and/or cryptographic elements are inserted to or generated by the secure element prior to provisioning of the device, such as at or before the time of device or element manufacture. For example, a device manufacturer may purchase a previously-manufactured secure element and integrate the secure element, including the associated credentials of the element, in the final design of the finished device. Subsequently, when the device is purchased (e.g., by a consumer), its packaging removed, and installed within an ecosystem network, a PKI protocol for the device may validate the keys and any associated certificates.

That is, in an exemplary embodiment, device provisioning is deferred to the vendor/seller of the device, and not required of the manufacturer (often a different entity from the vendor) of the secure element. According to the techniques described below, this segmentation of the registration and provisioning subprocesses enables better control of the PKI, while also providing for more immediate potential monetization of the certificates that are provided to the device.

FIG. 1 is a schematic illustration of an initialization and registration process 100 for a secure element 102. In the exemplary embodiment, process 100 coincides with the production of secure element 102 on a production line (not shown in FIG. 1). Secure element 102 may include, for example, an HSM, a TPM, a System on Chip (SoC), or another type of trusted hardware system. In this example depicted in FIG. 1, process 100 is implemented with respect to a registration and provisioning server 104 in operable communication with a registration database 106. In an embodiment, registration and provisioning server 104 may include a local CA, or alternatively may be in operable communication with a separate remote CA.

In exemplary operation, process 100 begins at step S108, in which secure element 102 is initialized. In at least one example of step S108, secure element 102 generates at least one key or keypair in Special Slot 0 (e.g., a distinct slot capable of holding a certificate, such as an X.509 certificate). In step S110, secure element 102 transfers the public key of the generated keypair and/or the certificate signing request (CSR) to server 104. In an embodiment, the CSR is created after the keypair is generated, and the private key of the keypair is kept secret in secure element 102, and the CSR contains identifying information of secure element 102 (e.g., a distinguished name in the case of an X.509 certificate). In an optional embodiment of step S110, together with the public key/CSR, secure element 102 transmits to server 104 additional information or data regarding secure element 102, including without limitation, element crypto capabilities, crypto parameters, an element serial number, a model description, an identifier of the element manufacturer (not shown in FIG. 1), and/or a date/time of manufacture.

In some embodiments, the additional data is sent in batches, where the data need not be injected into secure element 102 at the time of manufacture. Server 104 stores the received information in registration database 106, and in step S112, secure element 102 is ready to ship to the device manufacturer or integrator (not shown in FIG. 1). In this example, server 104 may be configured as both a registration and provisioning server, but needs only complete initialization and registration of secure element 102 at or about the time of manufacture, and may defer provisioning until secure element 102 is integrated into the electronic device, as described further below with respect to FIG. 2.

Use of Special Slot 0 raises some security considerations, particularly with respect to immutable hardware keys and device certificates. That is, some secure elements include immutable keys (e.g., slot 0) that cannot be updated. In some embodiments, because the public key cannot be revoked, it may be desirable to prevent exposure of the public key in the device certificate. In this case, process 100 may alternatively use the immutable key only for registration purposes, and then generate a second keypair for use in the device certificate. The immutable key from the original slot (i.e., first Special Slot 0) would then be used only for specific operations of the secure element 102, including without limitation, (i) element registration, (ii) re-provisioning of the device certificate, (iii) updates to secure-element trust anchors, and (iv) secure firmware updates for secure element 102.

Figure 2:
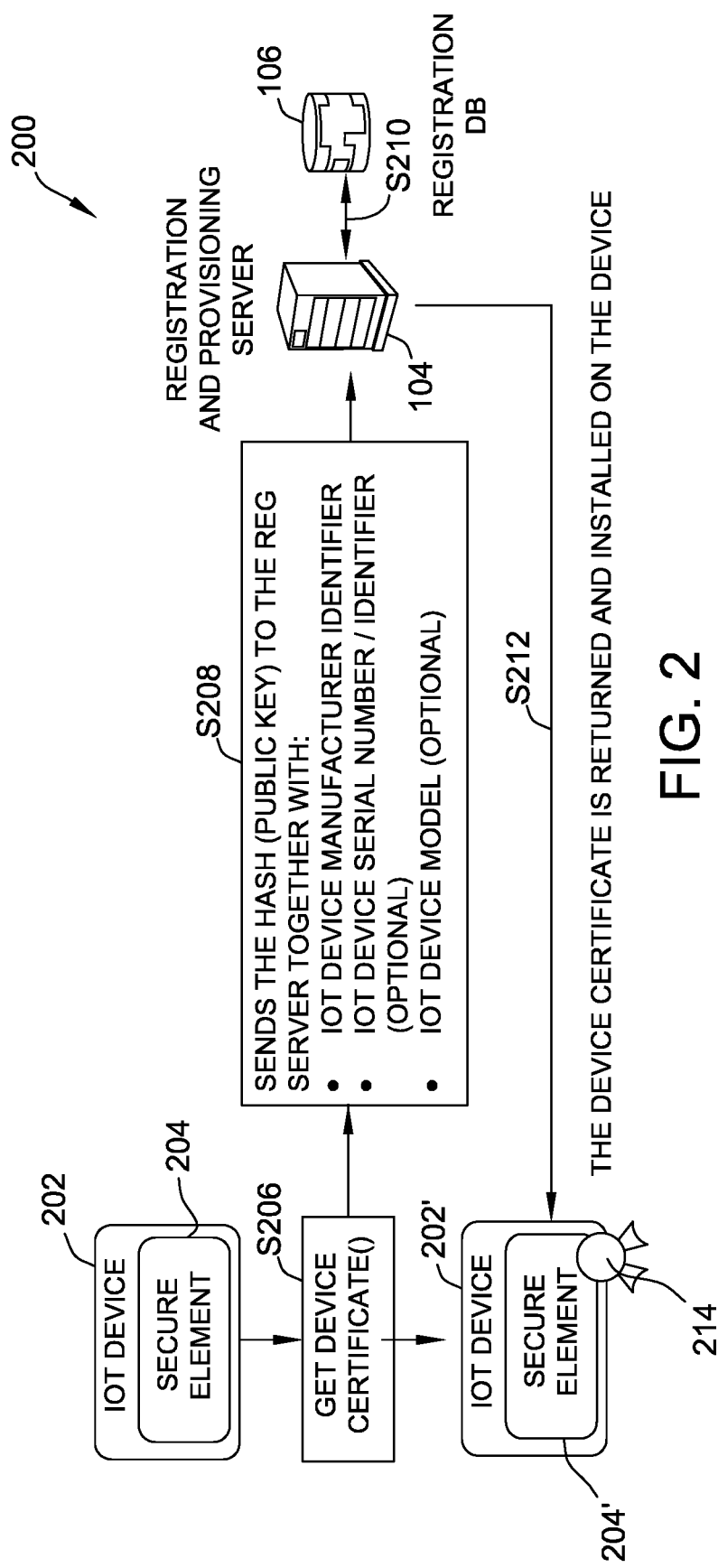
FIG. 2 is a schematic illustration of a device certificate provisioning process, in accordance with an embodiment.

FIG. 2 is a schematic illustration of a device certificate provisioning process 200. Process 200 is similar in some respects to process 100, FIG. 1, in that process 200 is also implemented utilizing registration and provisioning server 104 and registration database 106. Process 200 though, represents a provisioning operation deferred from process 100. In the exemplary embodiment, process 200 coincides with manufacture of an electronic device 202, including the integration of a secure element 204 therein, and is performed at the manufacturing site. Electronic device 202 may be, for example, an IoT device. In this example, secure element 204 may be similar in structure and function to secure element 102, FIG. 1, and secure element 204 may represent a secure element that has been initialized and registered according to process 100.

In exemplary operation, process 200 begins at step S206, in which the device certificates for device 202 are retrieved. In step S208, device 202 transfers a hash (i.e., the public key) from secure element 204 to server 104. In an exemplary embodiment of step S208, device 202 sends the hash/public key to server 104 together with an integrator ID of the device manufacturer. In an optional embodiment of step S208, device 202 additionally transmits to server 104 data regarding device 202, including without limitation, a device serial number, a model description, a device identifier, etc. In step S210, server 104 communicates with database 106. In an exemplary embodiment of step S210, the transmitted data is stored within database 106, and may optionally retrieve device certificates that may have been pre-generated (e.g., process 100, FIG. 1) when the public key is registered. In step S212, device certificate 214 is returned to device 202, and installed on device 202' within secure element 204'.

Figure 3:
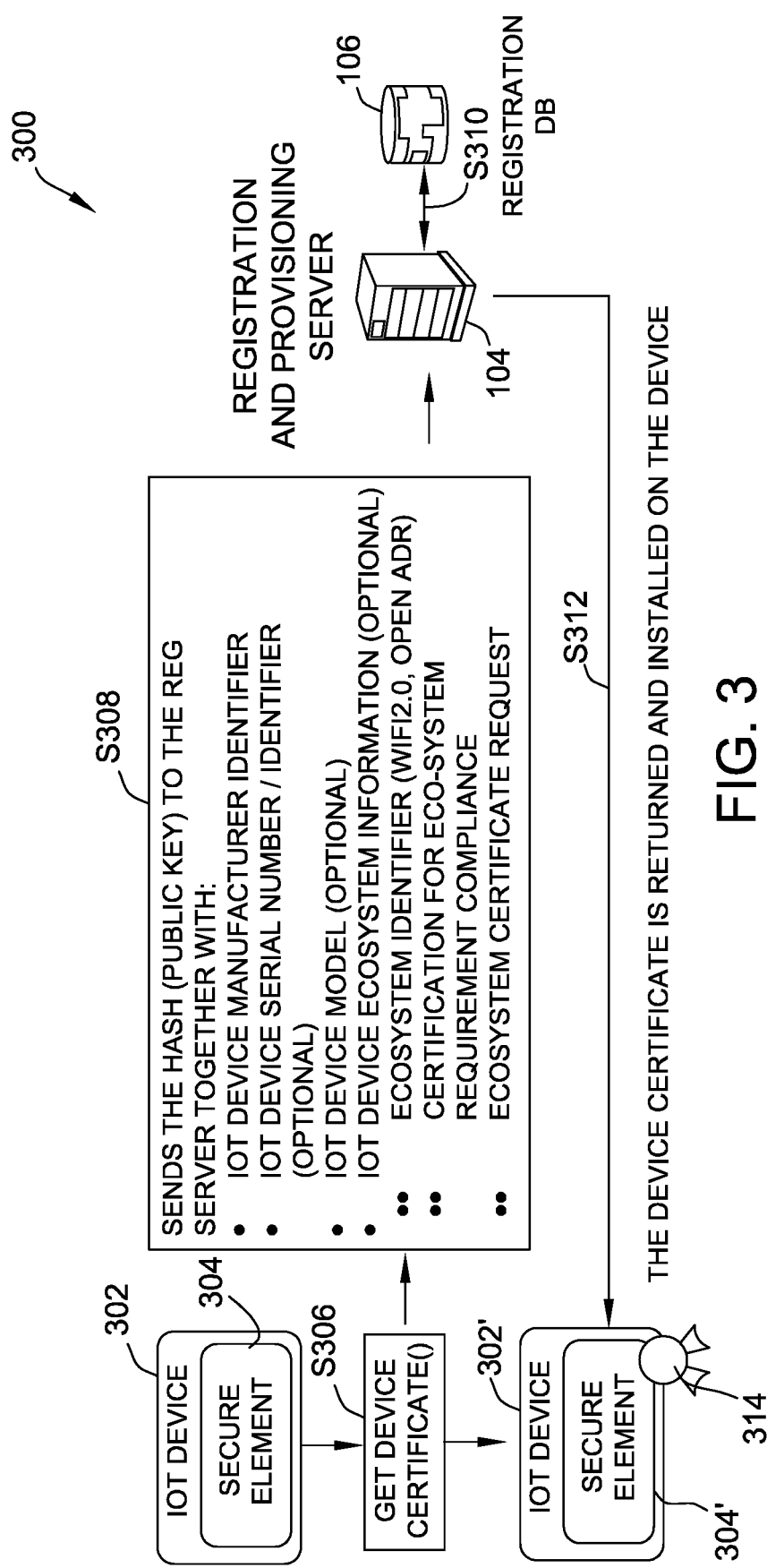
FIG. 3 is a schematic illustration of a device and ecosystem certificate provisioning process, in accordance with an embodiment.

FIG. 3 is a schematic illustration of a device and ecosystem certificate provisioning process 300. Process 300 is similar in some respects to process 200, FIG. 2, in that process 300 is also implemented at the device manufacturer, and utilizes registration and provisioning server 104 and registration database 106. Process 300 though, is further configured to provision ecosystem certificates in addition to the device certificates. In the exemplary embodiment, process 300 similarly coincides with manufacture of an electronic device 302, including the integration of a secure element 304 therein. Electronic device 302 may be similar, for example, to device 202, FIG. 2.

In exemplary operation, process 300 begins at step S306, in which the device certificates for device 302 are retrieved. In step S308, device 302 transfers a hash (i.e., the public key) from secure element 304 to server 104. An exemplary embodiment of step S308, device 302 transmits to server 104 information regarding at least one in which IoT device 302 is proposed to operate, including without limitation, an ecosystem identifier (e.g., WiFi2.0, OpenADR), a certification for ecosystem requirement compliance, and an ecosystem certificate request. In some embodiments, the ecosystem certificate request requires keypair generation. In at least one embodiment of step S308, device 302 additionally sends the hash/public key together with an integrator ID of the device manufacturer, and optionally transmits data regarding including a device serial number/identifier, a model description, etc. In step S310, server 104 communicates with database 106, similar to step S210, FIG. 2.

In step S312, device certificate 314 is returned to device 302, and installed on device 302' within secure element 304'. In an exemplary embodiment of step S312, an ecosystem certificate is additionally provisioned in the case where IoT device ecosystem information has been provided for the request. Alternatively, where ecosystem information is not been provided, device certificate 314 is provisioned together with a set of trust anchors required for operation of secure element 304'.

Figure 4:
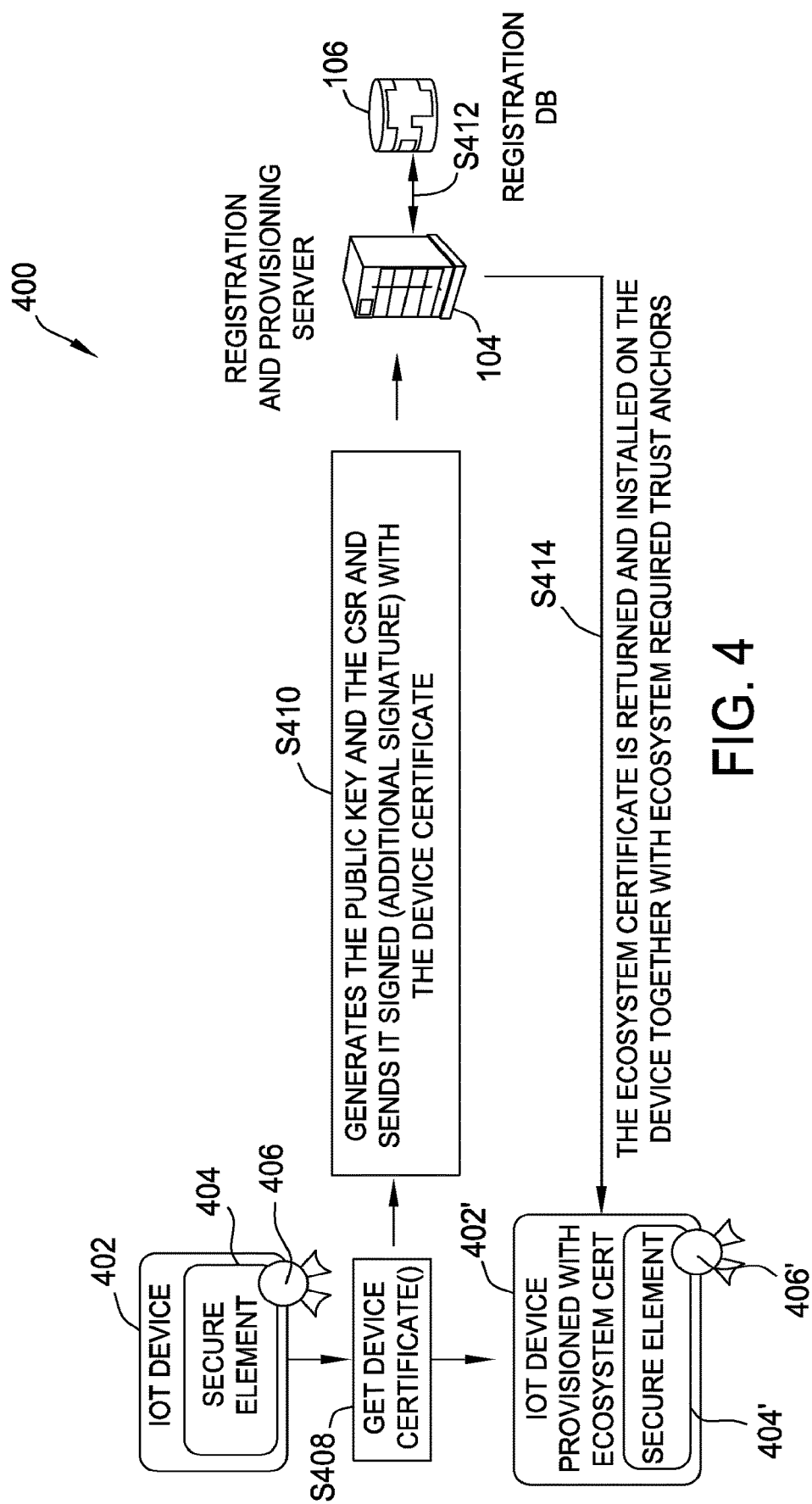
FIG. 4 is a schematic illustration of an ecosystem certificate provisioning process, in accordance with an embodiment.

FIG. 4 is a schematic illustration of an ecosystem certificate provisioning process 400. Process 400 is similar in some respects to process 300, FIG. 3, in that process 400 is also implemented utilizing registration and provisioning server 104 in operable communication with registration database 106. Process 400 though, differs from process 300 in that ecosystem certificate provisioning is performed in the field, that is, separate from the site of manufacturing. In the exemplary embodiment, process 400 is performed for an electronic device 402 (e.g., an IoT device) that includes a secure element 404 and a device certificate 406 therein. Electronic device 402 may be, for example, similar in structure and function to device 302', FIG. 3.

In exemplary operation, process 400 begins at step S408, in which the device certificates for device 402 are retrieved. In step S410, device 402 generates the public key and the CSR, and transmits the public key/CSR to server 104 along with device certificate 406. In an exemplary embodiment of step S410, device 402 signs the key and/or CSR with an additional signature. In step S412, server 104 communicates with database 106. In an exemplary embodiment of step S412, database 106 further includes information regarding the ecosystem certification and related details, which have been stored in a provisioning server (not shown) which may, for example, have been indicated by the device manufacturer during a device certificate provisioning process (e.g., process 300, FIG. 3). In step S414, an ecosystem certificate is returned to device 402 and installed on device 402', together with trust anchors required by the respective ecosystem of the ecosystem certificate. In this example, device 402' thereby becomes, upon completion of process 400, and IoT device provisioned with the ecosystem certificate, as well as the provisioned device certificate.

The exemplary embodiments described above provide significant advantages over conventional techniques for generating and managing device certificates. For example, according to the present systems and methods, device certificates may be more reliably, and immediately Monetized at the secure element vendor level, as opposed to the manufacturer level, wherein the risk of not recouping the cost is greater, and the monetization process is slower. More particularly, according to the present techniques, the PKI costs may be charged directly to the vendor when the public key of the secure element is registered. This more efficient "as needed" technique thus provides added security features that further drive sales of the secure element itself. Accordingly, billing of the PKI costs may be deferred to the time of actual installation of the certificate on the secure element, thereby reducing (or eliminating) the risk to the vendor that the vendor may be charged to pay for devices that are never installed (e.g., by a consumer).

The present systems and methods provide still further advantages over conventional techniques with respect to the generation and provisioning of ecosystem certificates. Specifically, as described above, in some cases, ecosystem certificate provisioning may occur at the device manufacturer, and thus charged directly to the manufacturer (i.e., such as in the case of an IoT device intended to be deployed in a known supported ecosystem). In such instances, the ecosystem certificate may be associated with details of the device, as opposed to the secure element, and the downstream vendor may then more reliably provide certification that the device is compliant to the ecosystem requirements. In other cases, ecosystem certificate provisioning may be deferred, and performed in the field subsequent to the device manufacture. Accordingly, ecosystem provisioning according to the present techniques is significantly more versatile than conventional techniques, and is enabled to selectively adjust when and where ecosystem provisioning occurs according to the requirements of the particular ecosystem, as well as the costs of maintaining the associated infrastructure.

For ease of explanation, the above embodiments are described with respect to more general PKI and keypair considerations. As described further below with respect to FIGS. 5 and 6, the present systems and methods may additionally provide still further significant improvements for provisioning secure elements with symmetric-only crypto capabilities.

Figure 5:
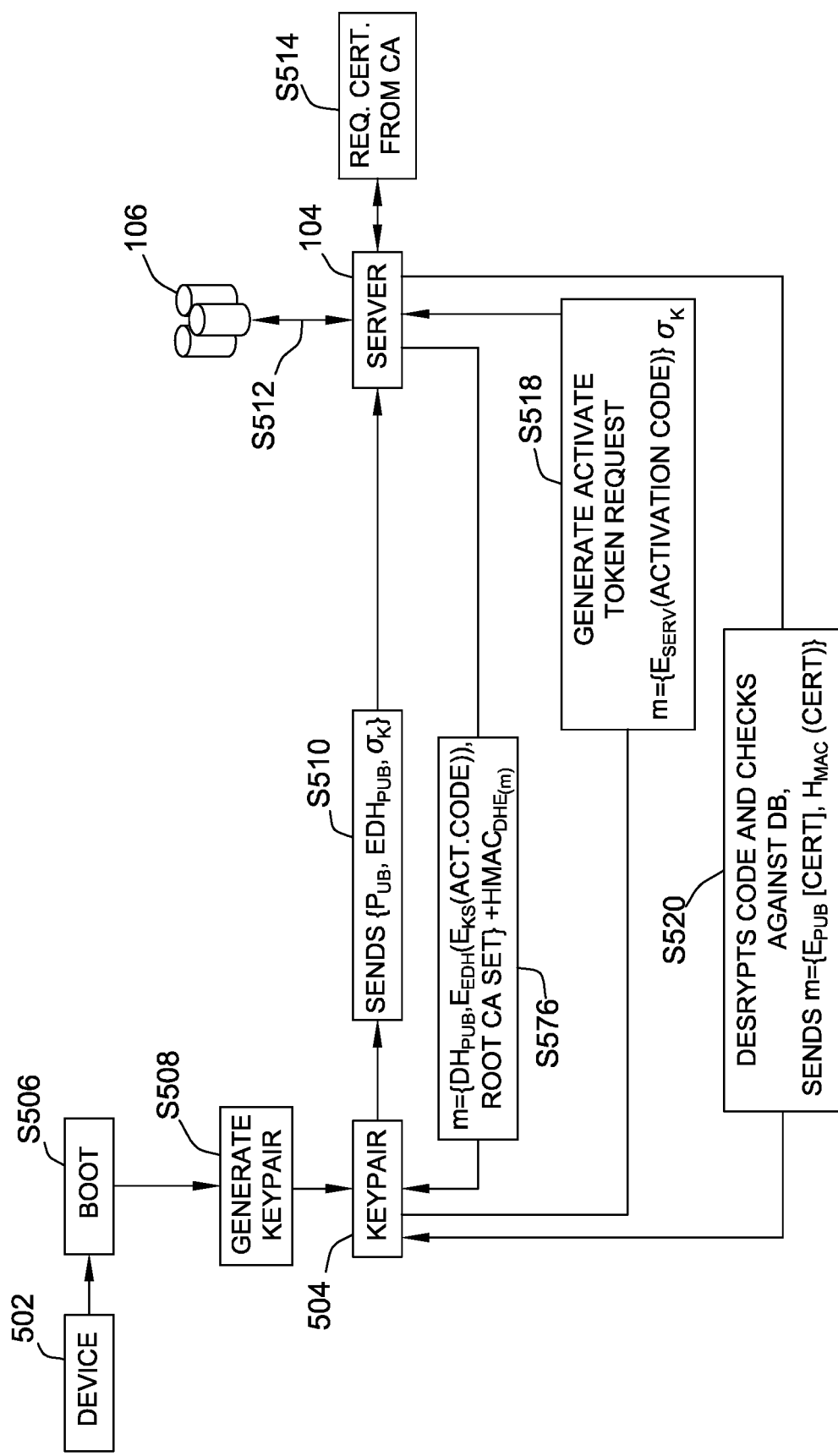
FIG. 5 is a schematic illustration of a device certificate registration and provisioning process, in accordance with an embodiment.

FIG. 5 is a schematic illustration of a device certificate registration and provisioning process 500. In the exemplary embodiment, process 500 is implemented with respect to a device 502 having a symmetric-only capable secure element (not shown in FIG. 5). That is, in this example, the secure element of device 502 may be alternatively provisioned with certificate-like data such as a token. Such device-identifying tokens may carry the hash of a private key of a keypair 504 on device 502, and device 502 may be configured to produce HMAC/encrypted tokens to prove the device identity to the respective registration system (e.g., which may include registration server 104 and registration database 106).

In the exemplary embodiment, the broader registration system is thus enabled to provide validation for device 502 with respect to the deployment of secure firmware or software updates, and also to provide a level of indirection for attesting the identity of device 502 by way of three-way protocols (e.g., OAuth, Kerberos, etc.). In this example, process 500 for device 502 is further implemented utilizing, for example, registration and provisioning server 104 and registration database 106, and is compatible with the PKI ecosystem using keypair 504. Process 500 may also be implemented for the secure element of device 502, which may be a microchip, or contained within a microchip architecture.

In exemplary operation, several of the following steps of process 500 may be performed substantially in the same manner as steps of the several process embodiments described above, which describe similar functional operations. Process 500 begins at step S506, in which a boot operation initializes integrated device 502. In step S508, device 502 generates keypair 504. In an at least one embodiment of step S508, keypair 504 is a first keypair, and includes a public key that is disclosed only for necessary secure element operations, but not disclosed in subsequent device (or ecosystem) certificates, which may include the public key of a second keypair generated for such security disclosure purposes.

In step S510, a public key of keypair 504 is transmitted to server 104, along with additional data/information has may be desired or required by at least one ecosystem, including without limitation, one or more of a DH parameter for an ephemeral mode (EDH, or DH ephemeral (DHE)) of the TLS of the public key used to provide forward secrecy ($EDH_{PUB}$), a value $\delta_{KP}$ of keypair 504, crypto capabilities of device 502 and/or the secure element contained therein, an identifier (DevID) of device 502 and/or the secure element. In step S512, server 104 communicates and exchanges information with database 106 in a manner similar to the several embodiments described above with respect to FIGS. 1-4. In step S514, server 104 optionally sends a request to the CA (e.g., a remote entity, or local to server 104) for the device certificate, and stores any certificates received thereby in database 106.

In step S516, server 104 transmits to keypair 504/device 502 a domain parameter, m (e.g., a token). In an exemplary embodiment of step S516, parameter m is transmitted together with related keyed hashing for message authentication code ($HMAC_{DHE}(m)$), and may include values for $DH_{PUB}$, the root CA set, and one or more shared secret(s) E, such as $E_{EDH}(E_{KS}(\text{Activation Code}))$. In step S518, process 500 generates and activate token request for keypair 504. In an exemplary embodiment of step S518, the transmitted parameter m includes shared secret(s) $E_{KS}(\text{Activation Code})/E_{SERVER}(\text{Activation Code})$ and a value $\delta_K$ of keypair 504. In at least one embodiment of step S518, process 500 is further configured such that device 502 or the secure element may perform an operation to get the registration token from server 104.

In step S520, server 104 decrypts the received code from device 502/keypair 504 and checks the code against information in database 106. In an exemplary embodiment of step S520, upon verifying the decrypted code, server 104 transmits parameter m/token to device 502/keypair 504. In this example, m includes or is based upon $E_{PUB}[\text{Certificate}]$ and $HMAC_{DHKey}(\text{Certificate})$. Upon receiving certificate-based tokens, device 502 may be provisioned in accordance with the techniques described above, and as described further below with respect to FIG. 6. In an exemplary embodiment of process 500, either of server 104 and database 106 is further configured to include a unique index, which may include, without limitation, one or more of values for parameters $H(K_{PUB})$, $ECDH_{Key}$, $K_{PUB}$, $E_{KS}(\text{Activation Code})$, $E_{KS}(\text{Issued Certificate})$, "isActive", and "isBilled".

Figure 6:
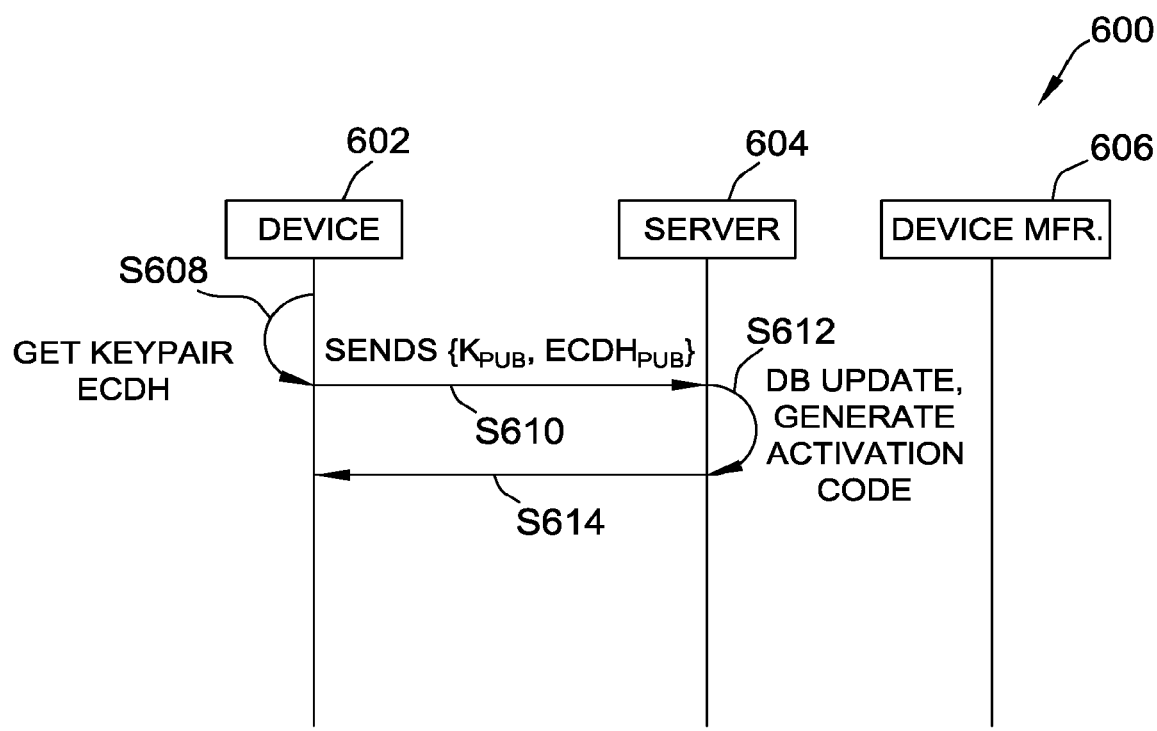
FIG. 6 is a provisioning sequence diagram which may coincide with the process depicted in FIG. 5.

FIG. 6 is a provisioning sequence diagram 600 which may coincide with process 500, FIG. 5. Sequence diagram 600 is performed with respect to an electronic device 602, a remote server 604, and a device manufacturing entity 606. In the exemplary embodiment, device 602 is similar to one or more of the electronic IoT devices described in the foregoing embodiments, and server 604 is similar to registration and provisioning server 104. In at least one embodiment, server 604 represents a plurality of servers provided in place with one or more HSMs, and or remote access web applications to provide a repeatable secure approach for provisioning/re-provisioning electronic device 602.

In an embodiment, sequence diagram 600 may represent a provisioning portion of process 500, such as in the case where provisioning is deferred from the time of device manufacture/integration of device 602, and instead performed in the field. Alternatively, sequence diagram 600 depicts a secure element re-provisioning protocol that may be performed at a time subsequent to an original provisioning of device 602, whether previously performed in the field or at the time of manufacture.

In exemplary operation, sequence diagram 600 begins at step S608, where device 602 is configured to generate and/or get the ECDH of the relevant keypair(s). In step S610, device 602 transmits $K_{PUB}$ and $ECDH_{PUB}$ to server 604. In step S612, server 604 updates the database (not shown in FIG. 6) and generates an activation code. In step S614, server transmits the activation code to device 602, along with any desired or necessary certificates, tokens, etc. According to the advantageous subprocess illustrated in sequence diagram 600, a secure element on an electronic device (e.g., device 602) may be repeatedly re-provisioned without having to involve the original manufacturer (e.g., device manufacturer 606), which may significantly add to the original production cost estimates charged by the manufacturer to the vendor, as an estimate to account for a number of times device 602 might reasonably be expected to be re-provisioned. By separating the provisioning operations from the initialization and registration operations, a more reliable and efficient security management process is implemented.

The present systems and methods therefore more efficiently leverage existing credentials that are used in secure elements, and are advantageously able to provide improved security at the message level, which greatly simplifies the requirements for smaller devices that might not conventionally implement more expensive PKI/security protocols. The present techniques are further adaptable to additionally provide transport security for TLS-capable devices where desired. In some embodiments, the present techniques are configured to define relatively "small" sets of messages that significantly simplify the state machine for handling the credentials of the secure element(s), including without limitation, deployment, renewal, and revocation operations.

In at least one embodiment, the present systems and methods may be further advantageously configured to implement a "one-request" message from connected devices for registration/provisioning, and a "one-response" message from the relevant servers upon encountering the message from the device. The "one-request" message may thus be configured to announce to the relevant server the presence of the device and its present credentials for registration/provisioning. The "one-response" message may then be configured to provide information to the requesting device regarding the status of the present credentials of the device, provisioning new credentials that are available on the server, and other required actions that may be appropriate to the particular device and server (e.g., requirements for new keys, repetition of the relevant protocol, etc.).

In this example, the request messages may be simplified to include information confined to an identifier of the secure element (e.g., ElementID), the device/element credentials, target values, and a message authentication. In a similar manner, the return response message may be simplified to include (e.g., after querying an associated registration database) a creation time of the ElementID, a time limit (e.g., a "notAfter" parameter, followed by a number of seconds) for the credentials, target values, a status of the credentials (e.g., "none", "valid", "revoked", "expired", etc.) on action required for the credentials (e.g., "none", "install", "genKeyPair", "remove", etc.), a type of the credentials (e.g., "x509cert"), trust anchors, and a message authentication.

The present systems and methods are therefore further advantageous over conventional techniques and that the embodiments herein enable protocol that can be repeated regularly, where desired, to discover possible new credentials, or new statuses of previously issued credentials. In one example, a "notBefore" parameter may be provided as a suggestion to the requesting device to repeat the protocol not before a specific timeout value. Accordingly, the "notBefore" parameter may be set to "0" so that the device is able to report newly generated keys in its next request to/interaction with the server. Alternatively, devices according to the present systems and methods may be configured to introduce a second type of request message to address newly generated keys apart from previously generated keys or credentials.

These techniques further allow the remote server to centralize the authentication operations, thereby relieving the burden on the device to have to check the validity of its own credentials. The present embodiments thus unable repeatable certificate renewals without requiring key rollover (e.g., of the same keys), and which may be fully supported with one roundtrip. Similarly, certificate renewal with key rollover may be supported with two round trips.

As described above, the present systems and methods are of particular use in the case where an electronic device is reset to factory status. According to the several processes described herein, such a device may be easily re-provisioned as described above, for example, by using the request message to recover the status of previously installed credentials (i.e., provided to the device in the return message from the server). More particularly, through interaction or synchronization with the server, the request message from the device enables the device to retrieve a snapshot of the device's present configuration from the server. Through these innovative techniques, the set of trust anchor's (e.g., Root and Intermediate CAs) may be more efficiently and timely updated (e.g., a simple replacement operation on the device) when needed, such as through a "trustAnchors" field provided in the response message from the server.

The exemplary systems and methods described and illustrated herein therefore significantly increase the commercial value of PKI implementation, and similar security measures, for technology industries and individual customers. PKI for certificates is validated more efficiently, on an "as needed" basis, thereby significantly reducing or eliminating the bill of materials risk to the manufacturer/integrator. Additionally, the burden of re-provisioning a device may be completely removed from the manufacturer, and more appropriately deferred to the vendor (or even customer/client, where appropriate).

According to the present embodiments, the cost of implementing PKI may be advantageously limited only to those cases where a device is actually installed, registered, and provisioned to a particular ecosystem. Therefore, the present embodiments operate to significantly reduce the cost of implementing PKI in a variety of technology industries, while also increasing the security of the number of integrated devices from this expanded PKI desirability. It is presently estimated, for example, that the number of IoT-connected devices is over 8 billion. The number of such deployed devices is expected to increase to over 20 billion within a few years, and to over 50 billion over the next decade. The cost savings and increased security resulting from the present embodiments is therefore considerably advantageous.

The present systems and methods our further advantageous over conventional techniques the embodiments herein are not confined to a single ecosystem, but may instead allow for versatile operation within multiple ecosystems, even in the case where each ecosystem has its own PKI. According to the present techniques, the manufacturer is relieved of the burden to anticipate which ecosystems may actually deploy the device, or how many times the device may require reprovisioning within a particular ecosystem. Accordingly, these novel techniques are of particular value to IoT device manufacturers who desire to have devices deployable within a variety of ecosystems, such as OCF, AllSeen/AllJoyn, Nest/Thread, Zigbee. Such devices are thus readily available for deployment in any of the anticipated ecosystems, but the manufacturer need not be concerned of the unknown costs of a device that may be deployed within multiple ecosystems.

Exemplary embodiments of systems and methods for registering and provisioning electronic devices are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for registering and provisioning an electronic device, the method comprising the steps of:
   generating, within an immutable key slot of a secure element, a first keypair parameter including a first public key parameter and a first private key parameter, wherein the step of generating is performed during or prior to a time of manufacture of the secure element;
   integrating the secure element into the electronic device;
   requesting, after the step of integrating, and from a remote server configured to register and provision connected devices, a provisioning of credentials of the electronic device;
   verifying, by the remote server, the electronic device credentials;
   registering, by the remote server, the electronic device having verified credentials;
   receiving, from the remote server by the registered electronic device, a device certificate;
   installing the transmitted device certificate within a second slot of the secure element of the registered electronic device, wherein the second slot is different from the immutable slot; and
   enabling the electronic device for provisioning according to the installed device certificate.

2. The method of claim 1, further comprising the step of initializing, after the step of generating and during or prior to the time of manufacture, the secure element.

3. The method of claim 1, wherein the secure element comprises at least one of a hardware security module, a trusted platform module, a system on a chip, and a software-based security protocol.

4. The method of claim 1, wherein the first keypair is generated by the secure element.

5. The method of claim 1, wherein the device certificate comprises an X.509 certificate.

6. The method of claim 1, wherein the step of requesting comprises transmitting the first public key parameter to the remote server.

7. The method of claim 6, wherein the step of requesting further comprises transmitting to the remote server at least one of an identifier of the secure element, a serial number of the secure element, a model description of the secure element, a manufacturer identifier of the secure element, a manufacturer identifier of the electronic device, a serial number of electronic device, model information of the electronic device, and one or more crypto parameters of the secure element.

8. The method of claim 6, wherein the step of registering comprises registration of the first public key parameter.

9. The method of claim 8, wherein the step of verifying comprises a substep of comparing a device certificate transmitted by the electronic device with a device certificate information stored in a remote database.

10. The method of claim 8, wherein the step of verifying comprises a substep of interacting with a certificate authority.

11. The method of claim 10, wherein the certificate authority comprises a local element of the remote server.

12. The method of claim 10, wherein the certificate authority is located separately from the remote server.

13. The method of claim 8, wherein the step of transmitting comprises a substep of retrieving, from a remote database, a pre-generated device certification.

14. The method of claim 1, wherein the step of provisioning is substantially performed at the time of integration of the secure element into the registered electronic device, and prior to shipment of the registered electronic device to a device vendor.

15. The method of claim 1, wherein the step of provisioning is performed in the field after the registered electronic device has been shipped to a device vendor.

16. The method of claim 1, further comprising the step of re-provisioning the electronic device after the step of provisioning.

17. The method of claim 16, wherein the step of re-provisioning is performed between the provisioned electronic device and the remote server, exclusive of a manufacturer of the secure element or the integrator of the electronic device.

18. The method of claim 1, further comprising the step of returning an ecosystem certificate from the remote server to the provisioned electronic device, and (ii) sending a set of ecosystem trust anchors to the provisioned electronic device.

19. The method of claim 1, wherein the step of generating further comprises generating a second keypair parameter within a third key slot of the secure element of the electronic device different from the immutable key slot, wherein the second keypair parameter includes a second public key parameter and a second private key parameter, wherein the first public key parameter is used to register the electronic device, and wherein the second public key parameter is used obtain the device certificate.

20. The method of claim 2, wherein the step of initializing the secure element comprises a boot operation.

* * * * *